(12) United States Patent
Quandt et al.

(10) Patent No.: US 8,991,895 B2
(45) Date of Patent: Mar. 31, 2015

(54) DOOR SYSTEM

(71) Applicant: GM Global Technology Operations LLC, Detroit, MI (US)

(72) Inventors: James K. Quandt, Warren, MI (US); William J. Majewski, Clinton Township, MI (US); David L. Brown, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 83 days.

(21) Appl. No.: 13/826,242

(22) Filed: Mar. 14, 2013

(65) Prior Publication Data
US 2014/0259934 A1 Sep. 18, 2014

(51) Int. Cl.
| | |
|---|---|
| *B60J 7/20* | (2006.01) |
| *B60J 7/00* | (2006.01) |
| *B60J 5/04* | (2006.01) |
| *B62D 65/06* | (2006.01) |

(52) U.S. Cl.
CPC ....... *B60J 7/0007* (2013.01); *B60J 5/04* (2013.01); *B62D 65/06* (2013.01); *B60J 7/203* (2013.01)
USPC .................................................. 296/107.08

(58) Field of Classification Search
CPC .............................................. B60J 7/20–7/208
USPC .............. 296/107.01, 107.08, 136.03–136.05
See application file for complete search history.

(56) References Cited

U.S. PATENT DOCUMENTS

| | | | | |
|---|---|---|---|---|
| 2,747,928 A * | 5/1956 | Olivier et al. | ............ | 296/107.08 |
| 5,921,608 A * | 7/1999 | Schmitt et al. | ............ | 296/107.08 |
| 5,967,593 A * | 10/1999 | Schuler et al. | ........... | 296/136.06 |
| 6,010,178 A * | 1/2000 | Hahn et al. | ................ | 296/107.08 |
| 6,318,792 B1 * | 11/2001 | Neubrand et al. | ....... | 296/107.08 |
| 6,454,343 B1 * | 9/2002 | Wagner et al. | ........... | 296/107.08 |
| 6,619,721 B1 * | 9/2003 | Langguth et al. | ........ | 296/136.06 |
| 6,644,715 B1 * | 11/2003 | Bohnke | .................... | 296/107.08 |
| 6,682,124 B1 * | 1/2004 | Bohnke | .................... | 296/107.08 |
| 6,682,149 B1 * | 1/2004 | Guillez et al. | ................ | 296/108 |
| 6,722,723 B2 * | 4/2004 | Obendiek | ............... | 296/107.08 |
| 7,252,323 B2 * | 8/2007 | Cole et al. | ............... | 296/107.08 |
| 7,322,635 B2 * | 1/2008 | Kuttner et al. | ........... | 296/107.08 |
| 7,347,482 B2 * | 3/2008 | Powell | ..................... | 296/107.08 |
| 7,419,200 B2 * | 9/2008 | Queveau et al. | ........... | 296/24.44 |
| 7,690,717 B2 * | 4/2010 | Baumeier | ................ | 296/136.06 |
| 7,753,432 B2 * | 7/2010 | Baumeier et al. | ........ | 296/107.08 |
| 7,753,433 B2 * | 7/2010 | Baumeier | ................ | 296/136.05 |
| 7,828,362 B2 * | 11/2010 | Araki et al. | ............... | 296/107.08 |
| 7,857,374 B2 * | 12/2010 | Weismuller et al. | .......... | 296/124 |
| 7,909,384 B2 * | 3/2011 | Trost | ........................ | 296/107.08 |
| 8,002,327 B2 * | 8/2011 | Condon et al. | ........... | 296/107.08 |
| 8,276,970 B2 * | 10/2012 | Schulz | ..................... | 296/107.08 |
| 8,602,484 B2 * | 12/2013 | Geissenhoner | ............ | 296/180.1 |
| 2002/0041109 A1 * | 4/2002 | Wagner et al. | ........... | 296/107.08 |
| 2006/0043758 A1 * | 3/2006 | Powell | ..................... | 296/107.08 |
| 2007/0040410 A1 * | 2/2007 | Baumeier | ................ | 296/136.06 |
| 2007/0152468 A1 * | 7/2007 | Cole et al. | ................ | 296/107.08 |
| 2008/0054673 A1 * | 3/2008 | Weismuller et al. | .......... | 296/124 |
| 2011/0291438 A1 * | 12/2011 | Schulz | ..................... | 296/107.08 |

* cited by examiner

*Primary Examiner* — Gregory Blankenship
(74) *Attorney, Agent, or Firm* — Quinn Law Group, PLLC

(57) ABSTRACT

A trim panel system includes a vehicle trim panel movably coupled to a vehicle body. The vehicle body defines a vehicle body opening. The vehicle trim panel is configured to move between an open position and a closed position wherein the vehicle trim panel covers the vehicle body opening. The trim panel system further includes an arm movably coupled to the vehicle body and a cable coupled between the vehicle trim panel and the arm. As such, the vehicle trim panel is configured to move from the closed position toward the open position in conjunction with a corresponding movement of the arm relative to the vehicle body and through the vehicle body opening.

20 Claims, 5 Drawing Sheets

DOOR SYSTEM

TECHNICAL FIELD

The present disclosure relates to systems, mechanisms, and methods for opening a trim panel in a convertible vehicle.

BACKGROUND

Motor vehicles typically include arms (also referred to as rails, linkages, and links) to move other components of the vehicle. For instance, the arms may be coupled to a convertible roof of a convertible vehicle. The vehicle may include trim panels configured to open and close a vehicle body opening to allow the arms to pass through the vehicle body opening. Thus, when the trim panel is in the open position, the arms can move through the vehicle body opening.

SUMMARY

The present disclosure relates to trim panel systems. In an embodiment, the trim panel system includes a vehicle trim panel movably coupled to a vehicle body defining a vehicle body opening. The vehicle trim panel is configured to move between an open position and a closed position wherein the vehicle trim panel covers the vehicle body opening. The trim panel includes an arm movably coupled to the vehicle body. Moreover, the trim panel system includes a cable coupled between the vehicle trim panel and the arm such that the vehicle trim panel is configured to move from the closed position toward the open position in conjunction with a corresponding movement of the arm relative to the vehicle body and through the vehicle body opening.

In an embodiment, the trim panel system includes a hinge assembly pivotally couple between the vehicle trim panel and the vehicle body. The hinge assembly includes a hinge plate configured to be coupled to the vehicle body and a hinge rod configured to be pivotally coupled to the vehicle trim panel. The trim panel system further includes a torsion spring coupled between the vehicle trim panel and the hinge assembly. The torsion spring is configured to bias the vehicle trim panel toward the closed position. The cable defines a first cable end portion, a second cable end portion, and a cable body disposed between the first cable end portion and the second cable end portion. The first cable end portion is coupled to the hinge plate. The trim panel system further includes a bracket coupled to the arm. The second cable end portion is coupled to the bracket. The trim panel system further includes a bar coupled to the vehicle trim panel. The cable body is disposed on the bar. The cable body is configured to slide along the bar. The trim panel system further includes a clock spring coupled between the bracket and the arm. The clock spring is configured to apply a force to the bracket to bias the vehicle trim panel toward the open position by urging the cable in a downward direction.

The present disclosure also relates to vehicles. In an embodiment, the vehicle includes a vehicle body defining a vehicle body opening, and a vehicle occupant compartment, a vehicle interior cavity. The vehicle body opening is in communication with the vehicle interior cavity. The vehicle further includes a vehicle trim panel pivotally coupled to the vehicle body. The vehicle trim panel is configured to pivot between an open position, in which the vehicle body opening is in communication with the vehicle interior cavity, and a closed position in which the vehicle trim panel closes the vehicle body opening. The vehicle further includes at least one arm movably coupled to the vehicle body. The vehicle further includes a convertible roof movably coupled to the vehicle body through the at least one arm. The convertible roof is configured to move between a stored position, in which the convertible roof does not cover the vehicle occupant compartment, and a covering position in which the convertible roof substantially covers the vehicle occupant compartment. The vehicle further includes a cable coupled between the at least one arm and the vehicle trim panel such that the vehicle trim panel is configured to move from the closed position toward the open position as the convertible roof moves from the stored position toward the covering position to allow the at least one arm to move through the vehicle body opening.

In an embodiment, the vehicle includes a hinge assembly pivotally coupling the vehicle trim panel to the vehicle body. The vehicle further includes a first biasing member coupled between the vehicle trim panel and the hinge assembly. The first biasing member is configured to bias the vehicle trim panel toward the closed position. The first biasing member may be a torsion spring. The vehicle may further include a bracket coupled between the cable and the at least one arm. The vehicle may further include a second biasing member coupled between the vehicle body and the bracket. The biasing member is configured to apply a force to the cable via the bracket to bias the vehicle trim panel toward the open position. The second biasing member may be a clock spring. The hinge assembly includes a hinge plate coupled to the vehicle body and a hinge rod coupled to the hinge plate. The vehicle trim panel is pivotally coupled to the hinge rod. The vehicle may further include a bar coupled to the vehicle trim panel. At least a portion of the cable is disposed over the bar such that the cable is configured to slide along the bar.

The present disclosure further relates to methods of manufacturing a vehicle. In an embodiment, the method includes pivotally coupling a vehicle trim panel to a vehicle body via a hinge assembly. The vehicle trim panel is configured to move relative to the vehicle body between a closed position, in which the vehicle trim panel closes a vehicle body opening defined by the vehicle body, and an open position. The method further includes coupling a bracket to an arm of a convertible roof assembly, and coupling a cable to the vehicle trim panel and the bracket.

In summary, the present disclosure relates to door mechanism and systems configured to open a flipper door to allow arms of a convertible roof assembly to pass through a vehicle body opening as the convertible roof moves from a stored position to a covering position in order to avoid interference between the arms and the vehicle body.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
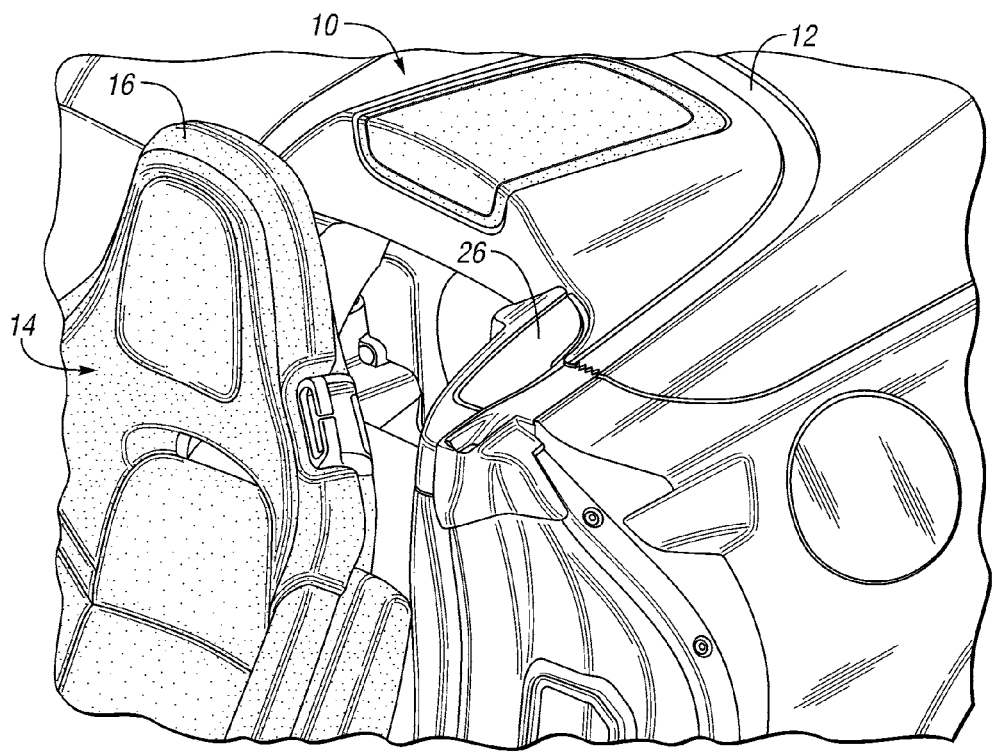
FIG. 1 is a schematic perspective view of a portion of a vehicle including a vehicle convertible roof assembly in a stored position and a vehicle trim panel in an open position.
Figure 2:
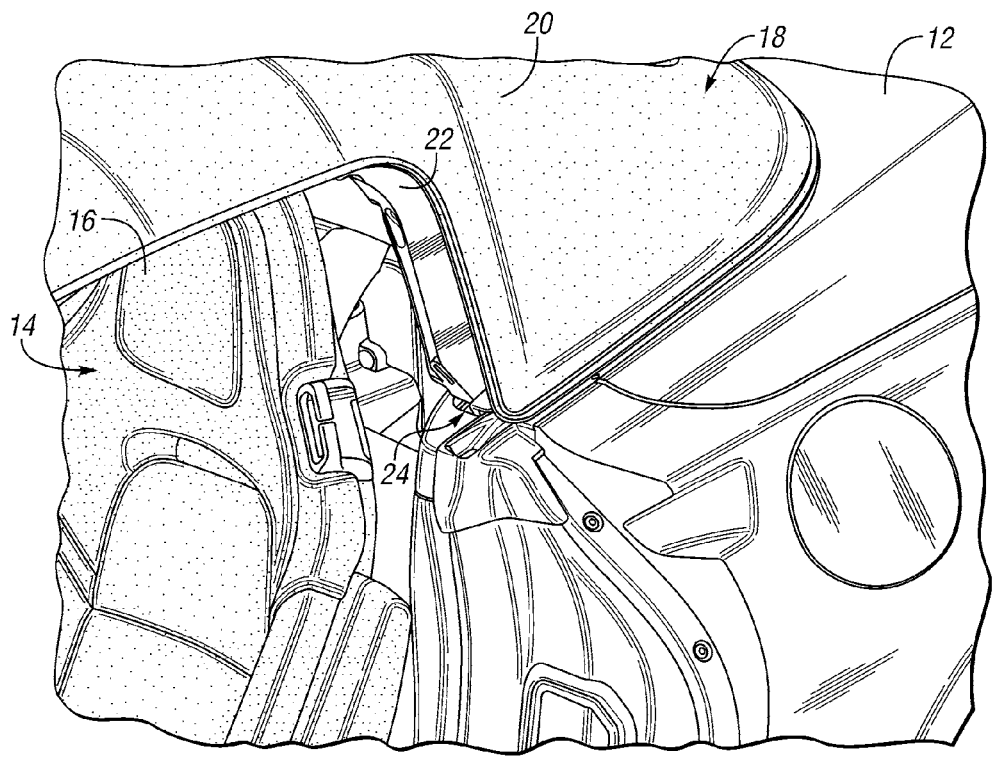
FIG. 2 is a schematic perspective view of the portion of the vehicle depicted in FIG. 1, showing the convertible roof assembly in a covering position and the vehicle trim panel in an open position.

Referring to the drawings, wherein like reference numbers correspond to like or similar components throughout the several figures, and beginning with FIGS. 1 and 2, a convertible vehicle 10 includes a vehicle body 12. The vehicle body 12 defines a vehicle occupant compartment 14 configured to accommodate a vehicle passenger or operator. To this end, the vehicle 10 may include at least one vehicle seat 16 disposed in the vehicle occupant compartment 14.

The vehicle 10 further includes a convertible roof assembly 18 (FIG. 2) having a convertible roof 20 and one or more arms, such as a first arm 22, coupled to the convertible roof 20. The arms, such as the first arm 22, may also be referred to as rails or links. The convertible roof 20 is configured to move between an open or stored position (FIG. 1) and a closed or covering position (FIG. 2). In the stored position, the convertible roof 20 does not cover the vehicle occupant compartment 14. Conversely, in the covering position, the convertible roof 20 substantially covers the vehicle occupant compartment 14. The first arm 22 may be electro-mechanical coupled to a motor (not shown). As such, the first arm 22 may move upon actuation of the motor, thereby causing the convertible roof 20 to move between the stored position and the covering position. Alternatively, the first arm 22 may be manually moved to move the convertible roof 20 between the stored position and the covering position.

Figure 3:
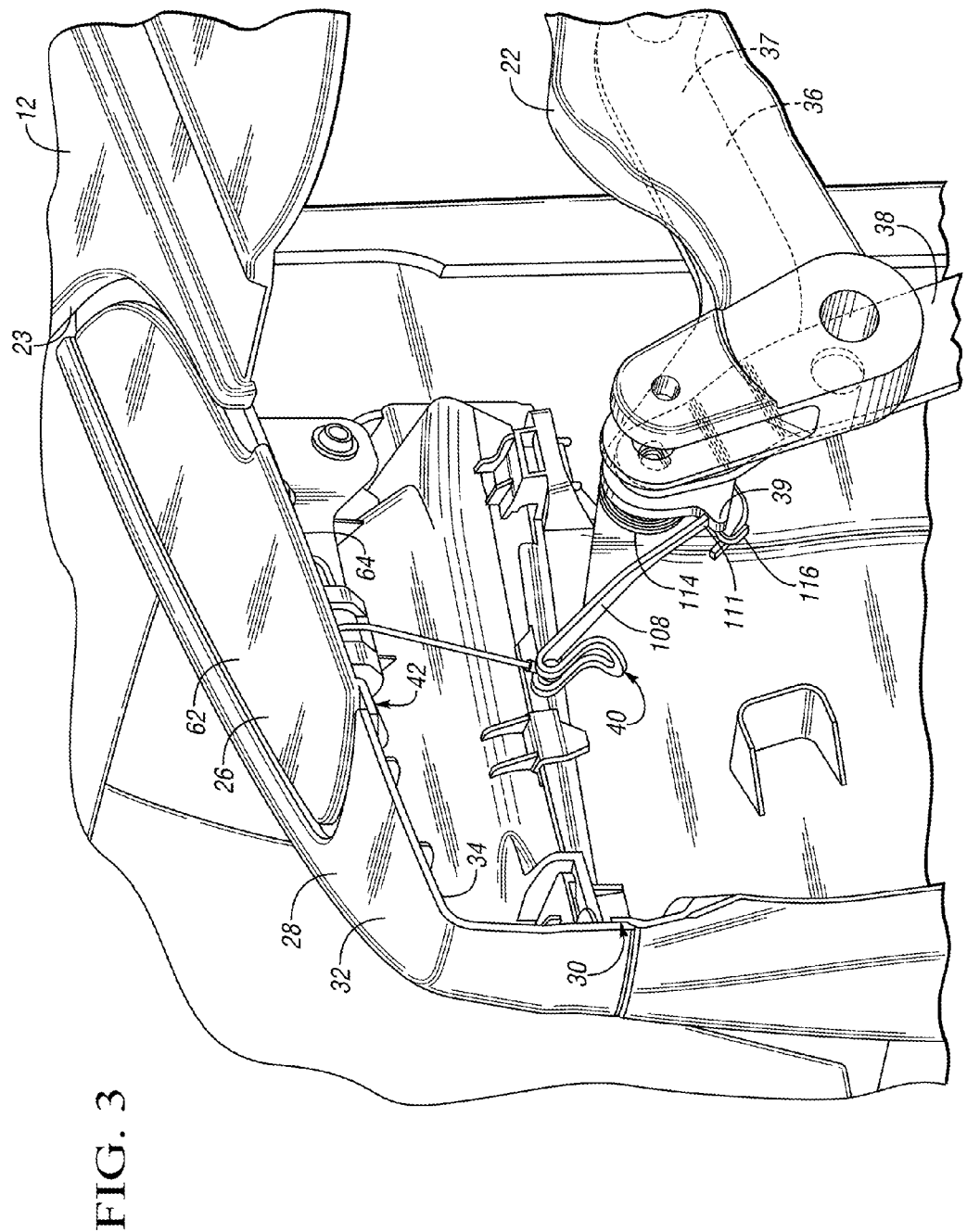
FIG. 3 is a schematic perspective cutaway view of the vehicle shown in FIG. 1, depicting the convertible roof assembly in the stored position, the vehicle trim panel in the closed position, and a door mechanism in a first position.
Figure 4:
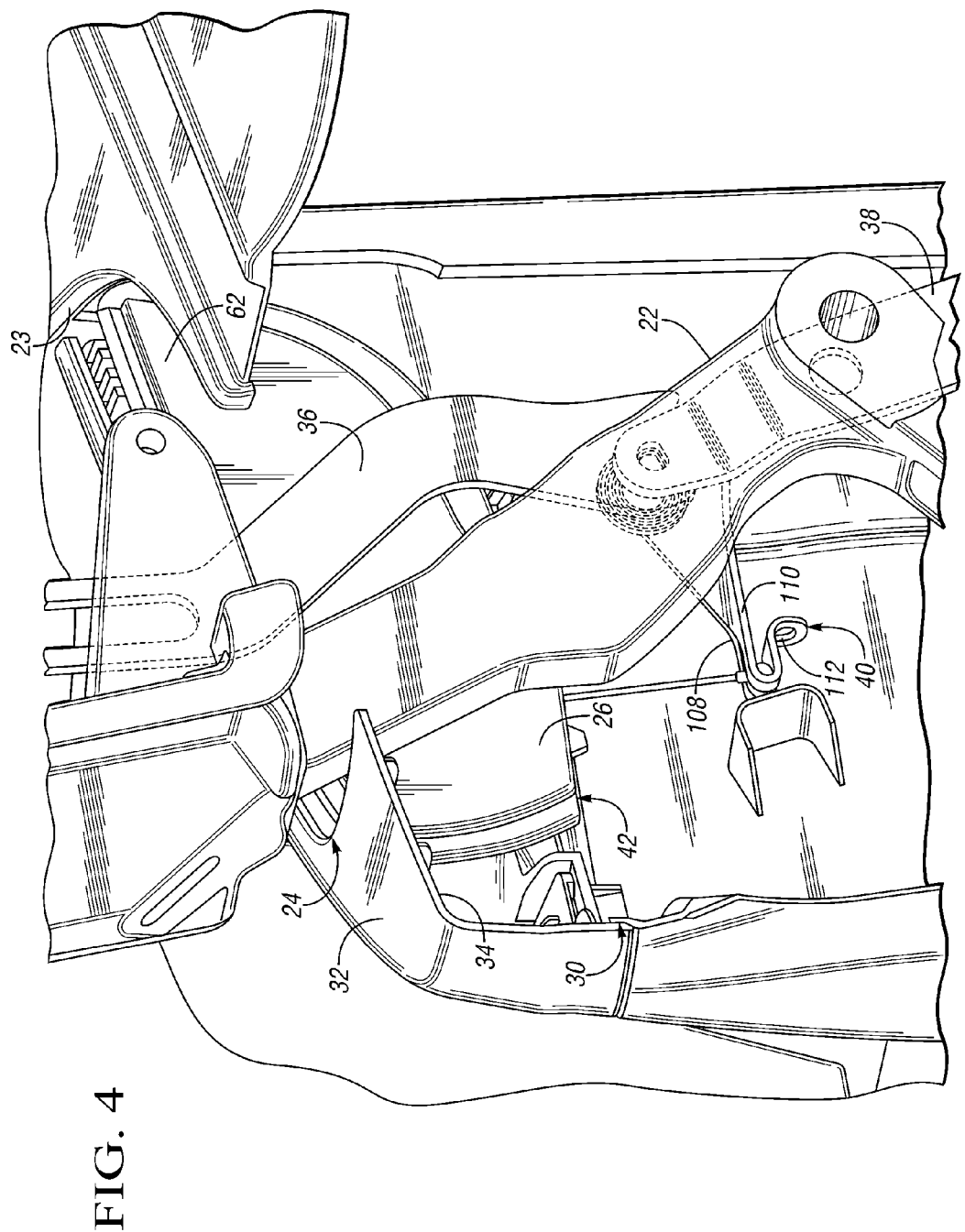
FIG. 4 is a schematic perspective cutaway view of the vehicle shown in FIG. 1, depicting the convertible roof assembly in the covering position, the vehicle trim panel in the open position, and the door mechanism in a second position.

While the convertible roof 20 moves between the stored position toward the covering position, the first arm 22 may need to move from an interior portion of the vehicle 10 to an exterior portion of the vehicle 10. To do so, the vehicle 10 defines a vehicle body opening 24 (FIG. 2) extending through the vehicle body 12. The vehicle body opening 24 is defined by an inner vehicle surface 23 (FIG. 4). The vehicle 10 may further include a vehicle trim panel 26 (FIG. 1) configured to close the vehicle body opening 24 (FIG. 2). The vehicle trim panel 26 is movably coupled to a portion of the vehicle body 12 such as another trim panel portion 28 (FIG. 3). As such, the vehicle trim panel 26 is configured to move between a closed position (FIG. 1) and an open position (FIG. 2). In the closed position, the vehicle trim panel 26 substantially closes the vehicle body opening 24, thereby precluding, or at least inhibiting, the first arm 22 from moving through the vehicle body opening 24. On the other hand, in the open position, the vehicle trim panel 26 does not close the vehicle body opening 24. Rather, when the vehicle trim panel 26 is in the open position, the vehicle body opening 24 is in communication with an interior portion of the vehicle 10 that houses at least part of the first arm 22 when the vehicle trim panel 26 is in the open position. Accordingly, the first arm 22 can move through the vehicle body opening 24 when the vehicle trim panel 26 is in the open position. The vehicle trim panel 26 may be referred to as a flipper door.

As seen in FIG. 2, the vehicle trim panel 26 can move downwardly toward the interior of the vehicle 10. It is desirable to move the vehicle trim panel 26 toward the interior of the vehicle 10 (instead of away from the interior of the vehicle 10) because, among other things, it is more aesthetically pleasing. It is also important to move the vehicle trim panel 26 in time to allow the first arm 22 (as well as other arms) to pass through the vehicle door opening 24 as the convertible roof 20 is moving from the stored position to the covering position in order to avoid interference between the first arm 22 (as well as other arms) and the vehicle body 12. Hence, it is desirable to develop a mechanism capable of moving the vehicle trim panel 26 toward the interior of the vehicle 10 in a timely manner to allow the first arm to move through the vehicle body opening 24 as the convertible roof 20 moves from the stored position to the covering position.

With reference to FIGS. 3-6, the vehicle body 10 includes the trim panel portion 28, which partially defines the vehicle body opening 24 and a vehicle interior cavity 30. When the vehicle trim panel 26 is in the open position (FIG. 4), the vehicle body opening 24 allows at least part of the first arm 22 to move between an inner region of the vehicle body 12, such as the vehicle interior cavity 30, and an outer region of the vehicle body 12 (e.g., any region of the vehicle 10 outside the vehicle interior cavity 30). Hence, when the vehicle trim panel 26 is in the open position, the vehicle body opening 24 leads to the vehicle interior cavity 30. However, in the closed position, the vehicle trim panel 26 precludes, or at least hinders, the first arm 22 from moving from the inner region of the vehicle body 12, such as the vehicle interior cavity 30, to the outer region of the vehicle body 12 (e.g., any region of the vehicle 10 outside the vehicle interior cavity 30). The vehicle trim panel 26 may have a substantially planar configuration and defines a first door surface 62 and a second door surface 64 opposite the first door surface 62. When the vehicle trim panel 26 is in the closed position (FIG. 3), the first door surface 62 faces away from the vehicle interior cavity 30, whereas the second door surface 64 faces toward the vehicle interior cavity 30.

The trim panel portion 28 defines a portion of the vehicle interior cavity 30 and has an outer trim surface 32 and an inner trim surface 34 opposite the outer trim surface 32. The inner trim surface 34 at least partially defines the vehicle interior cavity 30. The vehicle body 12 houses at least a portion of the convertible roof assembly 18 such as a portion of the first arm 22.

In addition to the first arm 22, the convertible roof assembly 18 may include a second arm 36 and a third arm 38. The second arm 36 includes a second arm body 37 and a second arm protrusion 39 extending from the second arm body 37. The third arm 38 may be fixed to the vehicle body 12. As such, the third arm 38 is configured to remain stationary with respect to the vehicle body 12. The first arm 22 and the second arm 36 may be movably coupled to the third arm 38. For example, the first arm 22 and the second arm 36 may be pivotally coupled to the third arm 38. A pivot pin (not shown) or any other suitable structure may pivotally couple the first arm 22 and the second arm 36 to the third arm 38. The first arm 22 and the second arm 36 are both coupled to the convertible roof 20 (FIG. 2) and can urge the convertible roof 20 to move between the stored position and the covering position. For instance, upon actuation of a motor, the first arm 22 and the second arm 36 can move from a first arm position (FIG. 3) to a second arm position (FIG. 4). In the depicted embodiment, the first arm 22 and the second arm 36 can pivot with respect to the third arm 38 upon actuation of a motor. Because the first arm 22 and the second arm 36 are coupled to the convertible roof 20, the movement of the first arm 22 and the second arm 36 from the first arm position (FIG. 3) to the second arm position (FIG. 4) causes the convertible roof 20 to move from the stored position (FIG. 1) to the covering position (FIG. 2). Similarly, moving the first arm 22 and the second arm 36 from the second arm position (FIG. 4) to the first arm position (FIG. 3) causes the convertible roof 20 to move from the covering position (FIG. 2) to the stored position (FIG. 1).

The vehicle 10 further includes a door mechanism 40 configured to move the vehicle trim panel 26 simultaneously as the convertible roof 20 moves between the stored position and the covering position to allow at least the first arm 22 and the second arm 36 to pass through the vehicle body opening 24. The door mechanism 40 may be part of a trim panel system 42 that includes the vehicle trim panel 26 and at least the second arm 36. Moreover, the door mechanism 40 operatively connects the second arm 36 to the vehicle trim panel 26. Due to this operative connection, the vehicle trim panel 26 can move between the open position and the closed position at the same time as the second arm 36 moves between the first arm position (FIG. 3) and the second arm position (FIG. 4) with respect to the vehicle body 12.

Figure 5:
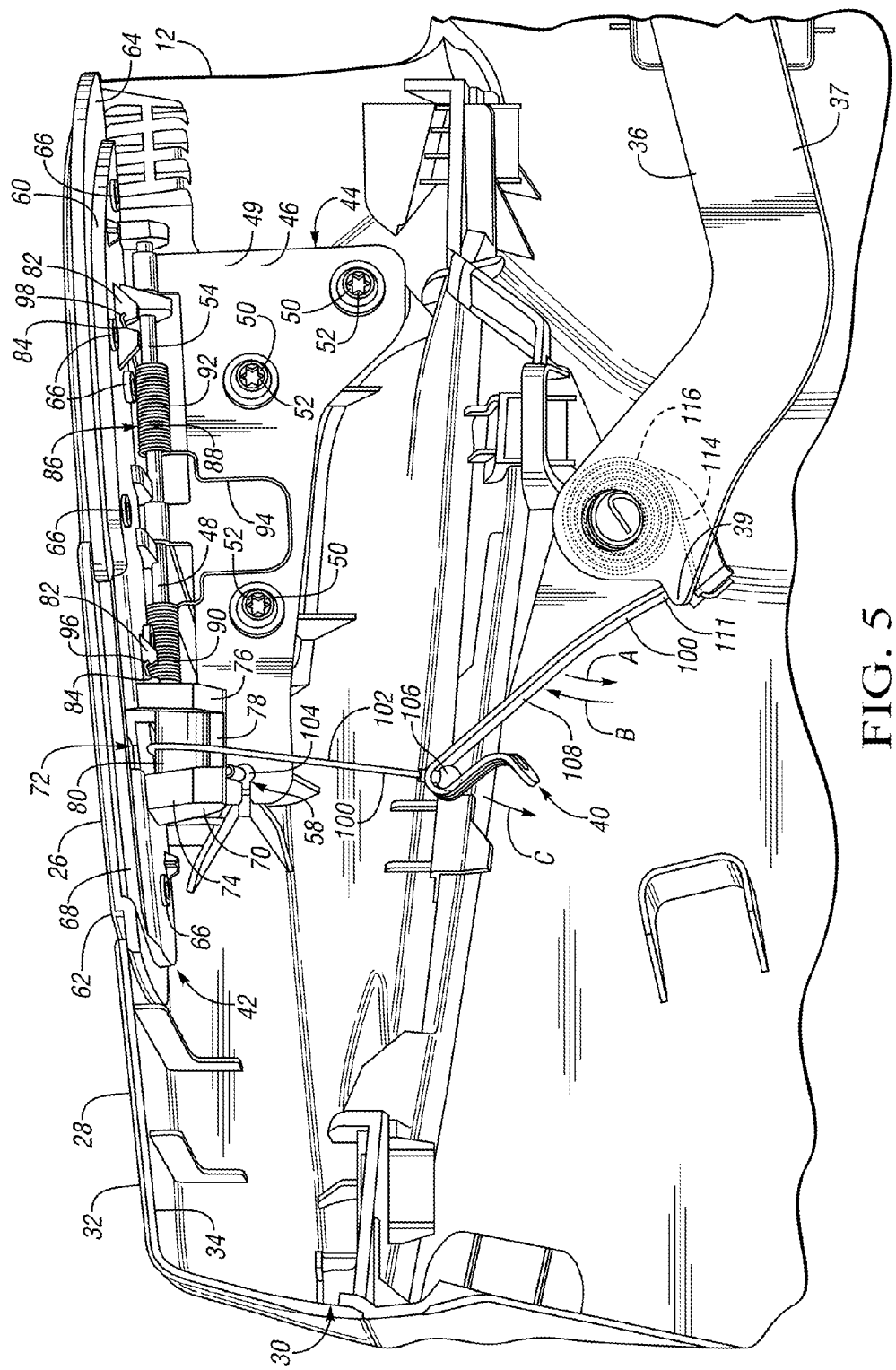
FIG. 5 is a schematic front cutaway view of the vehicle shown in FIG. 1, depicting the convertible roof assembly in the stored position, the vehicle trim panel in the closed position, and a door mechanism in the first position.
Figure 6:
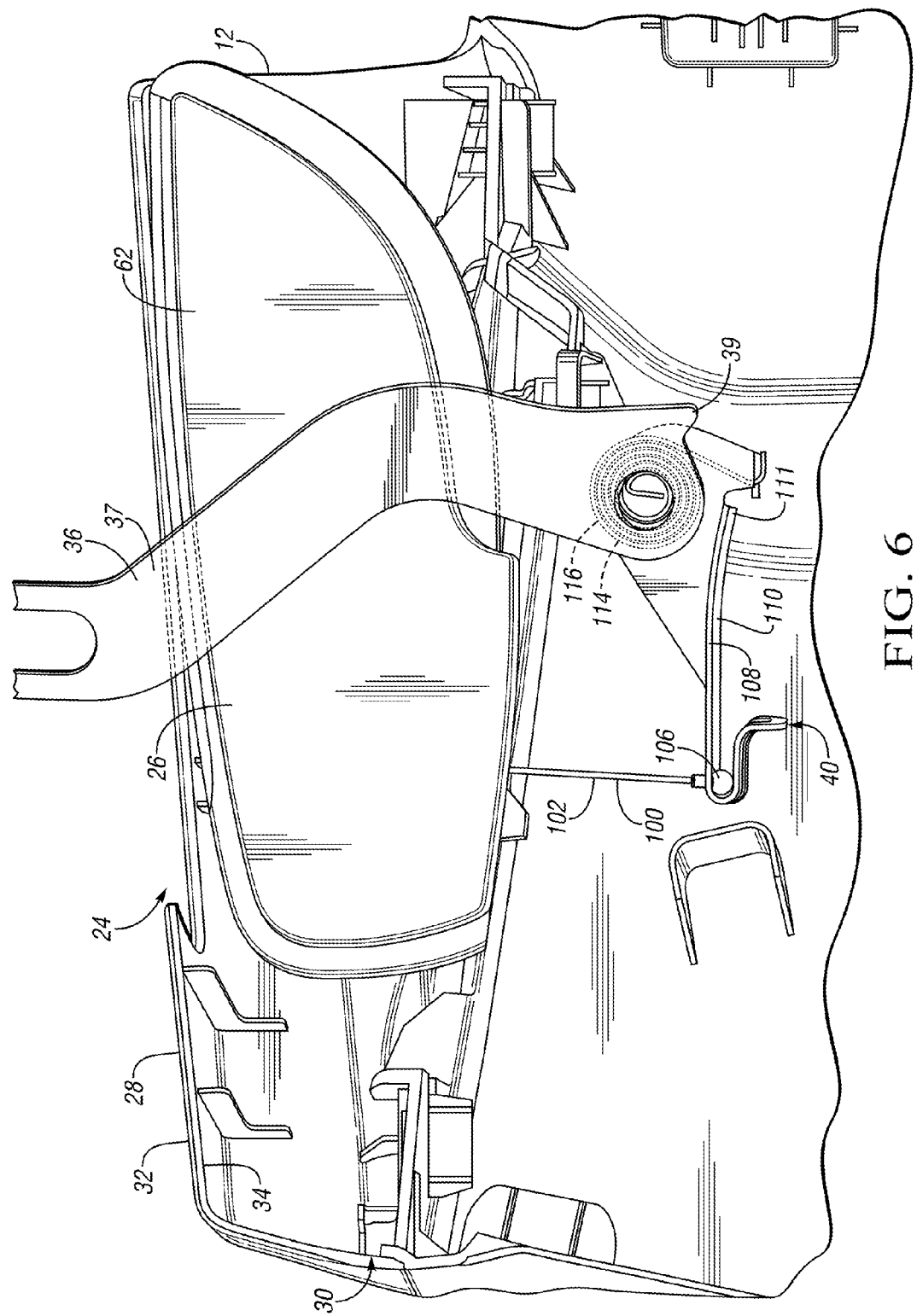
FIG. 6 is a schematic front cutaway view of the vehicle shown in FIG. 1, depicting the convertible roof assembly in the covering position, the vehicle trim panel in the open position, and the door mechanism in the second position.

With reference to FIGS. 5 and 6, the door mechanism 40 includes a hinge assembly 44 coupled between the vehicle trim panel 26 and the vehicle body 12. Specifically, the hinge assembly 44 may be coupled between the vehicle trim panel 26 and the trim panel portion 28 and includes a hinge support member 46 and a hinge pivot 48 coupled to the hinge support member 46. The hinge support member 46 may be configured as a hinge plate 49 and is coupled to the trim panel portion 28 within the vehicle interior cavity 30. Moreover, the hinge assembly 44 defines a hinge opening 58 extending through the hinge support member 46. As discussed in detail below, the hinge opening 58 is configured, sized, and shaped to receive another component of the door mechanism 40. In the depicted embodiment, the hinge support member 46 is coupled to the trim panel portion 28 along the inner trim surface 34 via a plurality of fasteners 50 such as screws 52. It is nonetheless contemplated that the hinge support member 46 may be coupled to the trim panel portion 28 via any suitable coupling apparatus or means such as adhesives, rivets, and welding. Regardless of the coupling apparatus or means employed, the hinge support member 46 remains stationary with respect to the trim panel portion 28 and the vehicle body 12 and is configured to support the hinge pivot 48.

The hinge pivot 48 is coupled to the hinge support member 46 and may be configured as a hinge rod 54. In the depicted embodiment, the hinge pivot 48 may have a substantially cylindrical shape and may be made of a substantially rigid material such as a metallic material. The vehicle trim panel 26 is pivotally coupled to the hinge pivot 48. Accordingly, the hinge assembly 44 pivotally couples the vehicle trim panel 26 to the vehicle body 12. Specifically, the hinge assembly 44 pivotally couples the vehicle trim panel 26 to the trim panel portion 28. As such, the vehicle trim panel 26 is configured to pivot between the closed position (FIG. 5) and the open position (FIG. 6). Although the drawings show that the hinge assembly 44 pivotally couples the vehicle trim panel 26 to the vehicle body 12 (via the trim panel portion 28), it is envisioned that vehicle 10 may include other mechanisms to movably couple the vehicle trim panel 26 to the vehicle body 12 such that the vehicle trim panel 26 can move between the closed position (FIG. 5) and the open position (FIG. 6). In the open position, the vehicle trim panel 26 is partly or completely disposed in the vehicle interior cavity 30. On the other hand, in the closed position, the vehicle trim panel 26 partly or completely closes the vehicle body opening 24.

The door mechanism 40 further includes a mounting member 60 coupled to the vehicle trim panel 26. The mounting member 60 may be coupled to the second door surface 64 via one or more heat stakes 66 or any other suitable couplers or means such as screws, rivets, or adhesives. Because the mounting member 60 is coupled to the vehicle trim panel 26, the mounting member 60 moves simultaneously with the vehicle trim panel 26.

The mounting member 60 includes a mounting body 68 and a bar support member 70 protruding from the mounting body 68. A gap 72 is defined between the bar support member 70 and the mounting body 68. In the depicted embodiment, the bar support member 70 includes a first support post 74 and a second support post 76. The first support post 74 and the second support post 76 are spaced apart from each other so as to partially define the gap 72. The bar support member 70 may further include a base 78 interconnecting the first support post 74 and the second support post 76.

The door mechanism 40 further includes a bar 80 disposed at least partly between the first support post 74 and the second support post 76. The bar 80 is at least partly disposed in the gap 72, and the bar support member 70 supports the bar 80. Accordingly, the bar 80 is coupled to the mounting member 60. Specifically, the first support post 74, the second support post 76, and the base 78 collectively support the bar 80, thereby coupling the bar 80 to the mounting member 60. The bar 80 may be made of a substantially rigid material such as a metallic material and may have a substantially smooth outer surface.

The mounting member 60 further includes one or more protrusions 82 extending from the mounting body 68. The protrusions 82 may be configured as flanges and each defines a recess 84. Each recess 84 is configured, shaped, and sized to receive another component of the door mechanism 40 as discussed in detail below.

The door mechanism 40 further includes a first biasing member 86 coupled between the vehicle trim panel 26 and the hinge assembly 44. As such, the first biasing member 86 is configured to bias the vehicle trim panel 26 toward the closed position (FIG. 5). In the depicted embodiment, the first biasing member 86 may be made of a metallic material and may be configured as a torsion spring 88. In the depicted embodiment, the first biasing member 86 may include a first coil portion 90 and a second coil portion 92. Each of the first coil portion 90 and the second coil portion 92 is disposed around a portion of the hinge pivot 48. However, the first coil portion 90 is spaced apart from the second coil portion 92 along the hinge pivot 48. The first basing member 86 may further include an intermediate spring portion 94 interconnecting the first coil portion 90 and the second coil portion 92. The intermediate spring portion 94 abuts the hinge support member 46. The first biasing member 86 may further include a first spring leg 96 extending from the first coil portion 90 and a second spring leg 98 extending from the second coil portion 92. At least a portion of the first spring leg 96 and the second spring leg 98 are received in a respective recess 84 of the mounting member 60.

The door mechanism 40 further includes a cable 100 coupled to the hinge assembly 44. The cable 100 may be wholly or partly made of a metallic material and is substantially flexible. In the depicted embodiment, the cable 100 includes a first cable end portion 104, a second cable end portion 106, and a substantially flexible cable body 102 disposed between the first cable end portion 104 and a second cable end portion 106. The first cable end portion 104 and the second cable end portion 106 may be configured as ball ends. Regardless of their configuration, the first cable end portion 104 may be coupled to the hinge support member 46, and the second cable end portion 106 may be coupled to a bracket 108 of the door mechanism 40. The first cable end portion 104 may be received in the hinge opening 58 so as to couple the hinge assembly 44 to the cable 100. At least a portion of the cable body 102 is slidably disposed on the bar 80. As such, the cable body 102 can slide along the bar 80 when the vehicle trim panel 26 moves between the open position and the closed position. Accordingly, the cable 100 can slide along the bar 80 as the convertible roof 20 (FIG. 2) moves between the stored position and the covering position. The gap 72 facilitates the sliding motion of the cable 102 along the bar 80.

The door mechanism 40 further includes the bracket 108, which is coupled to the second cable end portion 106 of the cable 100. Specifically, the bracket 108 includes a bracket body 110 and defines a bracket opening 112 (FIG. 4) extending through the bracket body 110. The bracket opening 112 is configured to receive the second cable end portion 106 so as to couple the cable 100 to the bracket 108. The bracket 108 further includes a bracket extension 111 protruding from the bracket body 110. The bracket extension 111 is configured to physically contact the second arm protrusion 39 of the second arm 36 as discussed in detail below.

The bracket 108 may be coupled to the second arm 36 (or any other arm such as the first arm 22). As discussed above, the second arm 36 is coupled to the first arm 22. Therefore, the first arm 22 and the second arm 36 may be configured to move simultaneously between the first arm position (FIG. 3) and the second arm position (FIG. 4). Because the bracket 108 is coupled to the second arm 36, the bracket 108 can move between a first bracket position (FIG. 5) and a second bracket position (FIG. 6) in response to a movement of the second arm 36. For example, the bracket 108 may be coupled to the second arm 36 by a pivot pin or any other suitable apparatus or means. Accordingly, the bracket 108 may pivot between the first bracket position (FIG. 5) and the second bracket position (FIG. 6). In particular, the bracket 108 may move in a first direction indicated by arrow A when it moves from the first bracket position to the second bracket position. Conversely, the bracket 108 may move in a second direction indicated by arrow B when it moves from the second bracket position to the first bracket position.

The door mechanism 40 may further include a second biasing member 114 coupled between the bracket 108 and the second arm 36. The second biasing member 114 may be configured as a clock spring 116. Irrespective of its configuration, the second biasing member 114 can bias the bracket 104 in the first direction (e.g., a downward direction) as indicated by arrow A. When the convertible roof 20 (FIG. 2) is in the stored position, the second arm 36 is in the first arm position (FIG. 5), and the bracket 108 is in the first bracket position (FIG. 5), the second biasing member 114 is in a compressed state and does not necessarily exert a biasing force in the first direction indicated by arrow A. As a consequence, the first biasing member 86 applies a biasing force to the vehicle trim panel 26, thereby maintaining the vehicle trim panel 26 in the closed position.

As discussed above, moving the first arm 22 and the second arm 36 from the first arm position (FIG. 5) to the second arm position (FIG. 6) causes the convertible roof 20 (FIG. 2) to move from the stored position (FIG. 1) toward the covering position (FIG. 2). Moreover, moving at least the second arm 36 from the first arm position (FIG. 3) toward the second arm position (FIG. 4) causes the bracket 108 to move from the first bracket position (FIG. 5) toward the second bracket position (FIG. 6). As the second arm 36 moves from the first bracket position (FIG. 5) toward the second bracket position (FIG. 6), the second biasing member 114 moves from the compressed state toward the uncompressed state. While moving toward the uncompressed state, the second biasing member 114 applies a biasing force to the bracket 108 that is sufficient to overcome the biasing force applied by the first biasing member 86 to the vehicle trim panel 26. If the second biasing member 114 is the clock spring 116, the clock spring 116 unwinds as the second arm 36 moves from the first arm position toward the second arm position. Consequently, because the bracket 108 is coupled to the cable 100, moving the bracket 108 from the first bracket position (FIG. 5) toward the second bracket position (FIG. 6) causes the cable 100 to be pulled downwardly in a third direction indicated by arrow C. As the cable 100 moves downwardly, the cable body 102 urges the vehicle trim panel 26 to move from the close position (FIG. 5) toward the open position (FIG. 6) to allow the first arm 22 and the second arm 36 to move through the vehicle body opening 24.

The convertible roof 20 (FIG. 2) may also be moved from the covering position to the stored position. To do so, the first arm 22 and the second arm 36 may be moved from the second arm position (FIG. 4) toward the first arm position (FIG. 3). Continued movement of the second arm 36 from the second arm position toward the first arm position causes the second arm protrusion 39 to move toward the bracket extension 111. Eventually, the second arm protrusion 39 physically contacts the bracket extension 111 and pushes the bracket 108 toward the first bracket position (FIG. 5). In other words, the second arm protrusion 39 exerts a force on the bracket extension 111. As a result, the bracket 108 begins to move from the second bracket position (FIG. 6) toward the first bracket position (FIG. 5). As the second arm protrusion 39 exerts a force on the bracket extension 111, the second biasing member 114 moves from the uncompressed state toward the compressed state. Specifically, as the second arm protrusion 39 exerts a force on the bracket extension 111, the clock spring 116 winds. Therefore, the force exerted by the second arm protrusion 39 on the bracket extension 111 is sufficient to overcome the biasing force exerted by the second biasing member 114 on the bracket 108, thereby allowing the vehicle trim panel 26 to move from the open position (FIG. 4) toward the closed position (FIG. 3) under the influence of the first biasing member 86.

The present disclosure also relates to methods of manufacturing the vehicle 10. The method may include pivotally coupling a vehicle trim panel 26 to a vehicle body 12 via a hinge assembly 44. As discussed above, the vehicle trim panel 26 is configured to move relative to the vehicle body 12 between a closed position, in which the vehicle trim panel 26 substantially closes a vehicle body opening 24 defined by the vehicle body 12, and an open position. The method further includes coupling the bracket 108 to the second arm 36 of the convertible roof assembly 18, and coupling the cable 100 to the vehicle trim panel 26 and the bracket 108.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A trim panel system comprising:
   a vehicle trim panel movably coupled to a vehicle body defining a vehicle body opening, the vehicle trim panel being configured to move between an open position and a closed position wherein the vehicle trim panel covers the vehicle body opening when disposed in the closed position;

an arm movably coupled to the vehicle body and a cable movably coupled between the trim panel and the arm such that the vehicle trim panel is configured to move from the closed position toward the open position in conjunction with a corresponding movement of the arm relative to the vehicle body and through the vehicle body opening; and wherein the cable is coupled between the arm and the vehicle trim panel such that the vehicle trim panel begins to move relative to the vehicle body from the closed position toward the open position at the same time that the arm begins to move relative to the vehicle body.

2. The trim panel system of claim 1, further comprising a hinge assembly pivotally couple between the vehicle trim panel and the vehicle body.

3. The trim panel system of claim 2, wherein the hinge assembly includes a hinge plate configured to be coupled to the vehicle body and a hinge rod configured to be pivotally coupled to the vehicle trim panel.

4. The trim panel system of claim 2, further comprising a torsion spring coupled between the vehicle trim panel and the hinge assembly, wherein the torsion spring is configured to bias the vehicle trim panel toward the closed position.

5. The trim panel system of claim 3, wherein the cable defines a first cable end portion, a second cable end portion, and a cable body disposed between the first cable end portion and the second cable end portion, the first cable end portion being coupled to the hinge plate.

6. The trim panel system of claim 5, further comprising a bracket coupled to the arm, wherein the second cable end portion is coupled to the bracket.

7. The trim panel system of claim 6, further comprising a bar coupled to the vehicle trim panel, wherein the cable body is disposed on the bar.

8. The trim panel system of claim 7, wherein the cable body is configured to slide along the bar.

9. The trim panel system of claim 6, further comprising a clock spring coupled between the bracket and the arm, wherein the clock spring is configured to apply a force to the bracket to bias the vehicle trim panel toward the open position by urging the cable in a downward direction.

10. A vehicle comprising:
a vehicle body defining a vehicle body opening, a vehicle occupant compartment, and a vehicle interior cavity, the vehicle body opening being in communication with the vehicle interior cavity;
a vehicle trim panel pivotally coupled to the vehicle body, wherein the vehicle trim panel is configured to pivot between an open position wherein the vehicle body opening is in communication with the vehicle interior cavity, and a closed position wherein the vehicle trim panel covers the vehicle body opening;
at least one arm movably coupled to the vehicle body;
a convertible roof movably coupled to the vehicle body by the at least one arm, the convertible roof being configured to move between a stored position wherein the convertible roof does not cover the vehicle occupant compartment, and a covering position wherein the convertible roof substantially covers the vehicle occupant compartment; and a cable coupled between the at least one arm and the vehicle trim panel such that the vehicle trim panel is configured to move from the closed position toward the open position as the convertible roof moves from the stored position toward the covering position to allow the at least one arm to move through the vehicle body opening; and wherein the cable is coupled between the at least one arm and the vehicle trim panel such that the vehicle trim panel begins to move relative to the vehicle body from the closed position toward the open position at the same time that the at least one arm begins to move relative to the vehicle body.

11. The vehicle of claim 10, further comprising a hinge assembly pivotally coupling the vehicle trim panel to the vehicle body.

12. The vehicle of claim 11, further comprising a first biasing member coupled between the vehicle trim panel and the hinge assembly, wherein the first biasing member is configured to bias the vehicle trim panel toward the closed position.

13. The vehicle of claim 12, wherein the first biasing member is a torsion spring.

14. The vehicle of claim 12, further comprising a bracket coupled between the cable and the at least one arm.

15. The vehicle of claim 14, further comprising a second biasing member coupled between the vehicle body and the bracket, wherein the biasing member is configured to apply a force to the cable via the bracket to bias the vehicle trim panel toward the open position.

16. The vehicle of claim 15, wherein the second biasing member is a clock spring.

17. The vehicle of claim 11, wherein the hinge assembly includes a hinge plate coupled to the vehicle body and a hinge rod coupled to the hinge plate.

18. The vehicle of claim 17, wherein the vehicle trim panel is pivotally coupled to the hinge rod.

19. The vehicle of claim 10, further comprising a bar coupled to the vehicle trim panel, wherein at least a portion of the cable is disposed over the bar such that the cable is configured to slide along the bar.

20. A method of manufacturing a vehicle, comprising:
pivotally coupling a vehicle trim panel to a vehicle body via a hinge assembly, the vehicle body defining a vehicle body opening, wherein the vehicle trim panel is configured to move relative to the vehicle body between a closed position wherein the vehicle trim panel covers the vehicle body opening, and an open position;
coupling a bracket to an arm of a convertible roof assembly; and
coupling a cable between the vehicle trim panel and the bracket such that the vehicle trim panel is configured to move from the closed position toward the open position in conjunction with a corresponding movement of the arm relative to the vehicle body and through the vehicle body opening; and
wherein the cable is coupled between the arm and the vehicle trim panel such that the vehicle trim panel begins to move relative to the vehicle body from the closed position toward the open position at the same time that the arm begins to move relative to the vehicle body.

* * * * *